United States Patent
Shetty et al.

(10) Patent No.: US 9,165,255 B1
(45) Date of Patent: Oct. 20, 2015

(54) AUTOMATIC SEQUENCING OF VIDEO PLAYLISTS BASED ON MOOD CLASSIFICATION OF EACH VIDEO AND VIDEO CLUSTER TRANSITIONS

(75) Inventors: Sanketh Shetty, Mountain View, CA (US); Ruei-Sung Lin, Redwood City, CA (US); David A. Ross, San Jose, CA (US); Hrishikesh Balkrishna Aradhye, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 518 days.

(21) Appl. No.: 13/559,429

(22) Filed: Jul. 26, 2012

(51) Int. Cl.
  *G06N 7/00* (2006.01)
  *G06K 9/62* (2006.01)
  *G06N 99/00* (2010.01)
  *H04N 21/262* (2011.01)
  *H04N 21/482* (2011.01)

(52) U.S. Cl.
  CPC .............. *G06N 7/005* (2013.01); *G06K 9/6256* (2013.01); *G06N 99/005* (2013.01); *H04N 21/26258* (2013.01); *H04N 21/4825* (2013.01)

(58) Field of Classification Search
  CPC .... G06N 99/005; G06N 7/005; G06K 9/6256
  USPC .......................................................... 706/12
  See application file for complete search history.

(56) References Cited

U.S. PATENT DOCUMENTS

| 6,446,080 B1 * | 9/2002 | Van Ryzin et al. ................ 1/1 |
| 2003/0093790 A1 * | 5/2003 | Logan et al. ................... 725/38 |
| 2008/0115173 A1 * | 5/2008 | Ellis et al. ..................... 725/61 |

OTHER PUBLICATIONS

Kamie et al. Effective Web Video Clustering using Playlist Information. SAC'12, pp. 949-956, Mar. 25-29, 2012.*
Ragno et al. Inferring Similarity Between Music Objects with Application to Playlist Generation. Proc. ACM Workshop on Multimedia Information Retrieval, pp. 8, 2005.*
Freund, Y., et al., "Experiments with a new boosting algorithm," In Proceedings of the 13th International Conference on Machine Learning, 1996, pp. 148-156.
Jain, A. K., et al., "Algorithms for clustering data," Prentice-Hall, Inc., Upper Saddle River, NJ, USA, 1988, Title page, Cover page and Table of Contents.
Maillet, F. G. D., et al., "Steerable playlist generation by learning song similarity from radio station playlists," In Proceedings of the 10th International Conference on Music Information Retrieval, 2009, pp. 148-156.
Zelnik-Manor, L., et al., "Self-tuning spectral clustering," In Advances in Neural Information Processing Systems 17, 2004, pp. 1601-1608.

(Continued)

*Primary Examiner* — Jeffrey A Gaffin
*Assistant Examiner* — Robert H Bejcek, II
(74) *Attorney, Agent, or Firm* — Fenwick & West LLP

(57) ABSTRACT

A given set of videos are sequenced in an aesthetically pleasing manner using models learned from human curated playlists. Semantic features associated with each video in the curated playlists are identified and a first order Markov chain model is learned from curated playlists. In one method, a directed graph using the Markov model is induced, wherein sequencing is obtained by finding the shortest path through the directed graph. In another method a sampling based approach is implemented to produce paths on the digraph. Multiple samples are generated and the best scoring sample is returned as the output. In a third method, a relevance based random walk sampling algorithm is modified to produce a reordering of the playlist.

16 Claims, 3 Drawing Sheets

(56) References Cited

OTHER PUBLICATIONS

Zhai, C., et al., "Beyond independent relevance: Methods and evaluation metrics for subtopic retrieval," In Proceedings of SIGIR, 2003, pp. 10-17.

Zhu, X., et al., "Improving diversity in ranking using absorbing random walks," In HLT-NAACL, 2007, pp. 97-104. The Association for Computational Linguistics.

* cited by examiner

AUTOMATIC SEQUENCING OF VIDEO PLAYLISTS BASED ON MOOD CLASSIFICATION OF EACH VIDEO AND VIDEO CLUSTER TRANSITIONS

TECHNICAL FIELD

This disclosure relates generally to sequencing videos or videos in a playlist.

BACKGROUND ART

The Internet is an increasingly popular medium for users to consume audio/video content. For example, users often use programs executing on computing devices to select videos they want to listen to and to organize their playlist according to their preferences. As such, audio/video playback programs (hereinafter 'media players') often provide a way for users to organize their playlist according to individual preferences. However, such programs often do not provide a method of sequencing audio/video content in an aesthetically pleasing way such that the sequence of files in a playlist provide a compelling user experience.

Media players typically try to generate an audio/video playlist (hereinafter 'video playlist') for a user by trying to identify videos a user may like to consume. For example, a video playback program may try to identify videos that a user may be interested in by identifying videos listed in the user's social networking system feed, by identifying videos in previous playlists created by the user, or by identifying the user's video playback history in one or more media players. However, these recommendations often result in video playlists that are ordered either chronologically or by random shuffle. Therefore, such programs fail to sequence playlists in an aesthetically pleasing way.

Some media players and information retrieval systems try to improve a chronological search result by promoting diversity within search results. Such programs produce a new ordering of a given set of items by presenting relevant results while simultaneously promoting diverse results to the top. However, in such systems, the reordering is done independent of themes presented in the retrieved documents. Thematic diversity in retrieved videos, such as metal, soft rock, pop, hip-hop may be arranged in an aesthetically pleasing way; however, such systems provide no emphasis on the order in which these themes are presented.

Some information retrieval programs try to sequence a playlist by stringing subsequences of videos together. For example, a program may analyze radio playlists to learn models of good subsequences of videos and assemble a playlist by stringing together subsequences from a library of video. However, such programs fail to generate a sequence of videos from a fixed set of videos which may or may not include videos used in a radio playlist subsequence. Some systems use permutation modeling to generate a sequence of videos in a playlist. However, such systems are typically complex and it is difficult to implement such modeling to sequence a large quantity of videos on a regular basis.

SUMMARY

Embodiments of the present disclosure provide methods and systems for sequencing videos in a playlist. The method comprises extracting mood descriptors from adjectives associated with curated and uncurated playlists in a video repository. The mood descriptors generally provide a summary of musical attributes of most videos each playlist. Additionally, the method provides for identifying curated playlists among the playlists in the video repository, wherein the curated playlists are ordered by a user. Additionally, a classifier is trained from the extracted mood descriptors to generate dimensional mood features for each video in the curated playlists. The musical mood features are clustered and videos in curated playlists are mapped to each cluster. Thereafter, a transition matrix describing a frequency of transitions between the clusters for each curated playlist is generated. Sequencing a given playlist occurs by using the generated transition matrix and additionally using at least one of digraph routing, sampling and random walk sequencing methods.

A computer program product comprises computer data signal physically embodied in a carrier wave, wherein the computer data signal comprises extracting mood descriptors from adjectives associated with curated and uncurated playlists in a video repository. The mood descriptors generally provide a summary of musical attributes of most videos each playlist. Additionally, the computer program product comprises data signal that provides for identifying curated playlists among the playlists in the video repository, wherein the curated playlists are ordered by a user. Additionally, the computer program product comprises data signals that provide a classifier is trained from the extracted mood descriptors to generate dimensional mood features for each video in the curated playlists. The musical mood features are clustered and videos in curated playlists are mapped to each cluster. Thereafter, a transition matrix describing a frequency of transitions between the clusters for each curated playlist is generated by the signals in the computer program product. Sequencing a given playlist occurs by using the generated transition matrix and additionally using at least one of digraph routing, sampling and random walk sequencing methods.

The features and advantages described in this summary and the following detailed description are not all-inclusive. Many additional features and advantages will be apparent to one of ordinary skill in the art in view of the drawings, specification and claims hereof.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Overview

Figure 1:
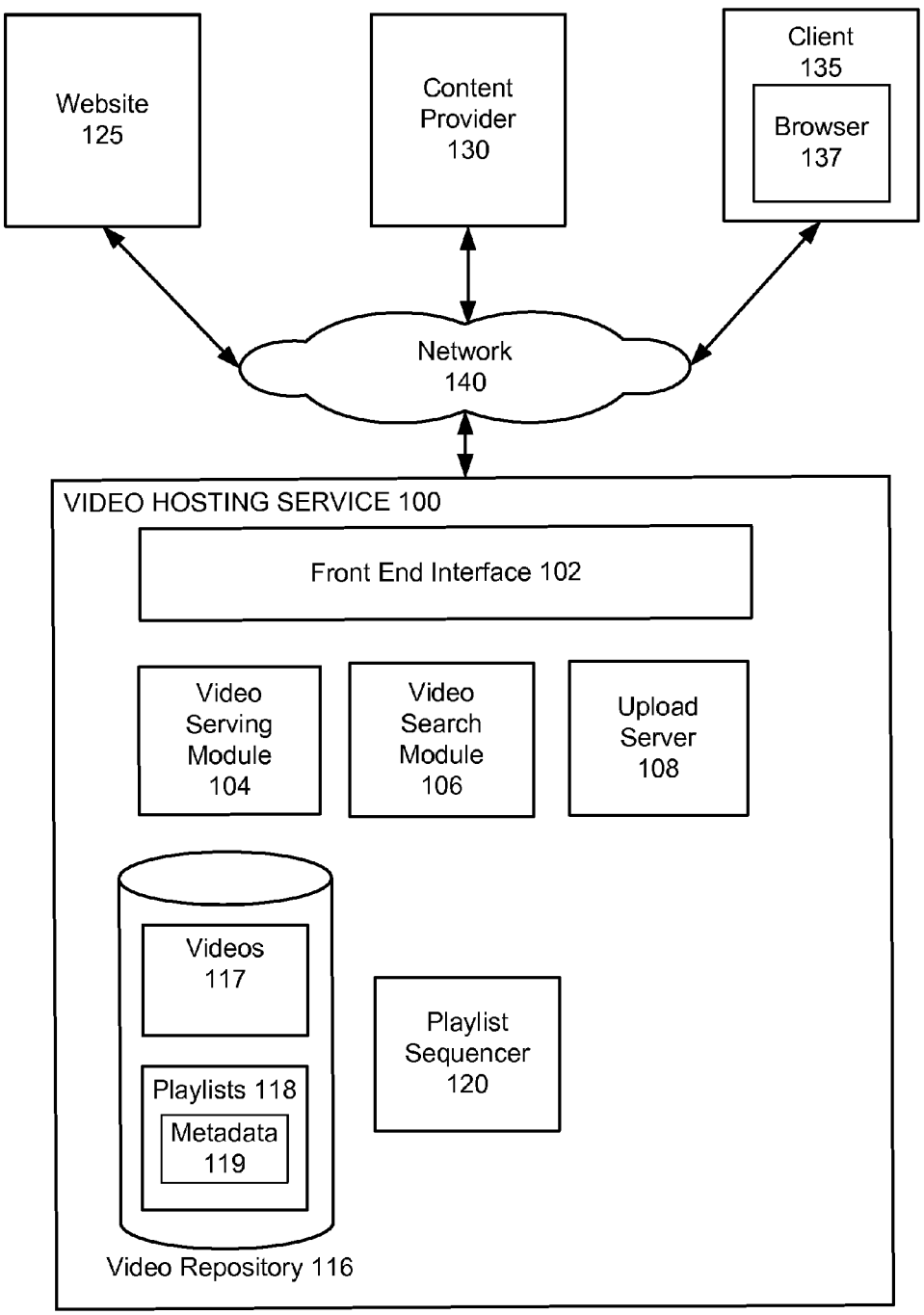
FIG. 1 is block diagram of a system architecture for sequencing a playlist, in accordance with an embodiment.

FIG. 1 illustrates a system architecture of a video hosting service 100 in accordance with one embodiment of the present invention. As shown in FIG. 1, a video hosting service 100 comprises a front end interface 102, a video serving module 104, a video search module 106, an upload server 108, a video sequencer 120 and a video repository 116 comprising videos 117 and playlists 118, wherein each playlist 118 includes associated metadata 119.

The video hosting service 100 represents a system such as that of YOUTUBE™ that stores and provides videos to users via a client device 135. The video hosting service 100 communicates with a plurality of content providers 130 and client devices 135 via a network 140 to facilitate sharing of video content between users. The video hosting service 100 can additionally obtain data from various external web sites 125.

Generally, a user of the content provider device 130 provides video content to the video hosting service 100 and a (usually different) user uses a client device 135 (also referred to simply as "client") to view that content. In practice, content provider devices 130 may also be used to view content. Additionally, a particular content provider device 130 may be operated by the same entity that operates the video hosting service 100.

The user of the content provider device 130 performs various content provider functions. Content provider functions may include, for example, uploading a video to the video hosting service 100, editing a video stored by the video hosting service 100, editing metadata information about a video, or editing content provider preferences associated with a video.

Once content is provided and hosted on the video hosting service 100, a user may use a client device 135 (also referred to simply as "client") to view the video. The video hosting service 100 may also provide additional functionality to its users to improve the user's viewing experience. For example, the video hosting service 100 may enable users to create video playlists containing two or more videos. Additionally, the users are enabled to curate the video playlists. For example, the users are enabled arrange the videos within a playlist in an order that is aesthetically pleasing to the user. Similarly, the users are also enabled to label or tag their playlists such that the playlists can be saved by the video hosting service 100 and retrieved by the users. The curated playlists and their associated labels serve as input data for classifier training performed by the video sequencer 120 and to sequence uncurated playlists stored with the video hosting service 100.

A client device 135 is a computing device that executes client software, e.g., a web browser or built-in client application, to connect to the video hosting service 100 via a network 140 and to display videos. The client device 135 might be, for example, a personal computer, a personal digital assistant, a cellular, mobile, or smart phone, a television "set-top box," or a laptop computer. In some embodiments, the client 135 includes an embedded video player such as, for example, the FLASH player from Adobe Systems, Inc. or any other player adapted for the video file formats used in the video hosting service 100.

Note that the terms "client" and "content provider" as used herein may refer to software providing client and content providing functionality, to hardware devices on which the software executes, or to the entities operating the software and/or hardware, as is apparent from the context in which the terms are used.

The website 125 comprises one or more web pages accessible to the video hosting service 100 via the network 140. The web pages comprise, for example, textual content such as HTML. The website may make available additional types of media content, such as general textual documents, presentations, audio files, image files, and the like.

The network 140 is typically the Internet, but may be any network, including but not limited to a LAN, a MAN, a WAN, a mobile wired or wireless network, a private network, or a virtual private network.

The video hosting service 100 uses curated playlists when training video classifiers. The video hosting service includes a front end interface 102, a video serving module 104, a video search module 106, an upload server 108, a video repository 116 and a video sequencer 120. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE™ website, found at www.youtube.com. Other video hosting sites are known, as well, and can be adapted to operate according to the teachings disclosed herein.

In this description, the term "module" refers to computational logic for providing the specified functionality. A module can be implemented in hardware, firmware, and/or software. It will be understood that the named modules described herein represent one embodiment of the present disclosure, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the service 100, loaded into memory, and executed by the one or more processors of the service's computers. The foregoing further applies to components described herein as "servers." As will become apparent, the various data processing operations described herein are sufficiently complex and time consuming as to require the operation of a computer system such as the system 100 in order to practice embodiments of the disclosure.

The upload server 108 of the video hosting service 100 receives video content from a content provider 130. Received content is stored in the video repository 116. In response to requests from clients 135, a video serving module 104 provides video data from the video repository 116 to the clients. Clients 135 may also search for videos of interest stored in the video repository 116 using a video search module 106, such as by entering textual queries containing keywords of interest. The front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. The video repository 116 is implemented using a database or file system, and indexing system for indexing and retrieving videos. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 further have associated metadata 119, e.g., textual metadata such as a title, description, and/or tags provided by a content provider 130 who uploaded the video, or obtained by an analysis of a video done by a component video hosting service 100.

Figure 2:
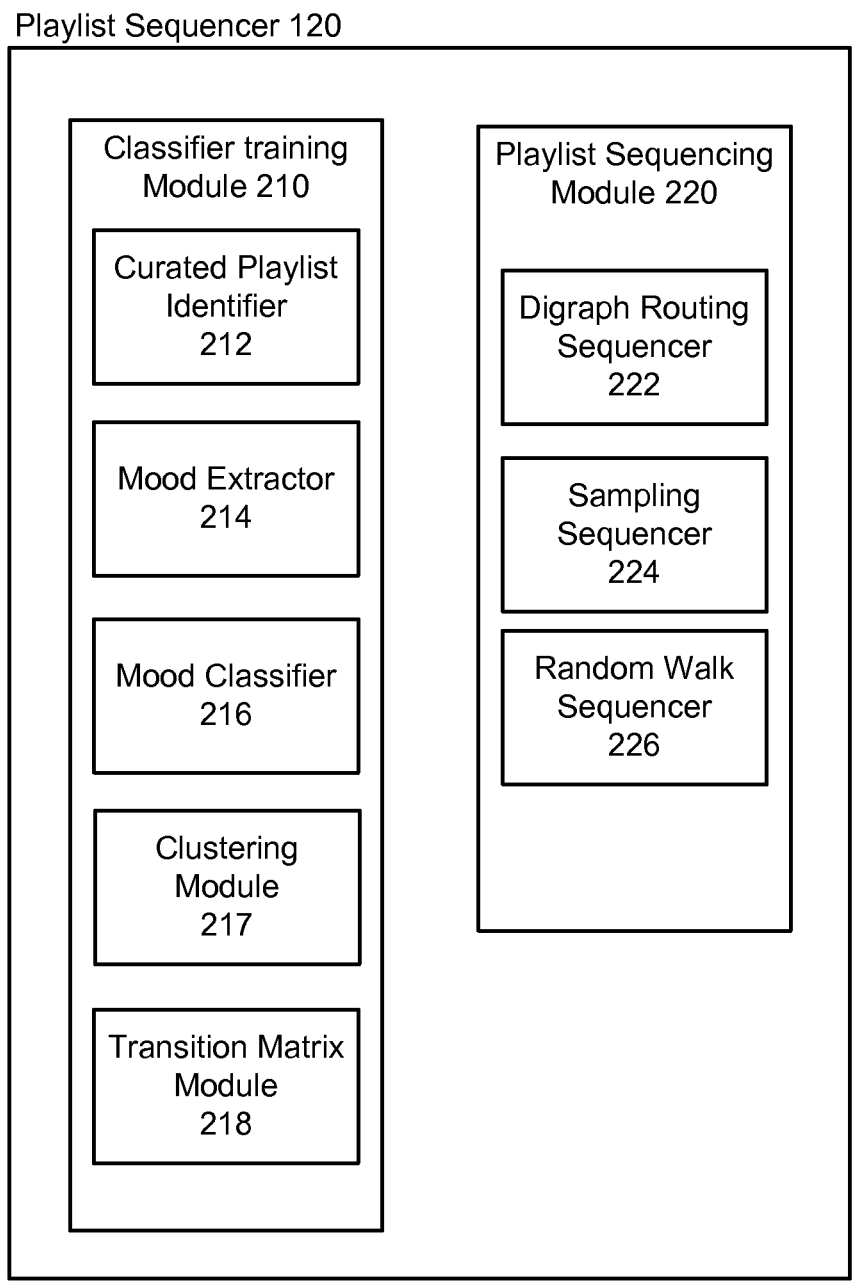
FIG. 2 is a block diagram of a sequencing engine, in accordance with an embodiment.

The video hosting service 100 further comprises a playlist sequencer 120 that trains a classifier to sequence videos in a playlist. The playlist sequencer 120 trains a classifier by identifying a curated playlist, extracting moods associated with the curated playlists, training mood classifiers. Additionally, the video sequencer 120 sequences a playlist based on the trained classifier and a sequencing method. The playlist sequencer 120 is described in greater detail in FIG. 2.

Playlist Training

A user client 135 executes the browser 137 to access a website 125, such as YOUTUBE™, to play videos in a playlist. Typically, users sequence the playlist manually or shuffle the videos to play the videos in a random sequence. However, a playlist sequencer 120 of a video hosting service 100 may sequence the videos in an aesthetically pleasing manner for the user. The playlist sequencer 120 comprises a classifier training module 210 comprising a curated playlist identifier 212, a mood extractor 214, mood classifier trainer 216, clustering module 217 and a transition matrix 218. Additionally, the playlist sequencer 120 also comprises a playlist sequencing module 220 comprising a digraph routing sequencer 222, a sampling sequencer 224 and a random walk sequencer 226.

The curated playlist identifier 212 of the playlist sequencer 120 identifies curated playlists. A curated playlist comprises any list or ordering of a plurality of videos in a playlist that has been ordered by a user. The curated playlist identifier 212 examines, for example, public, music video playlists created on a video hosting server 100 such as YOUTUBE™ to identify curated playlists. A video hosting server 100 tags each video in a playlist with a timestamp that indicates the date and time the video was added to the playlist, and its position on the playlist. It is assumed that most users add videos to a playlist without considering the order in which they are to be played. However, users who prefer a specific order for playlist perusal, explicitly reorder the playlist once the videos are added, by moving videos higher or lower in the playlist order relative to their position at the time they were added to the playlist. The ordering of videos in a playlist based on date and time they were added to the list is their chronological ordering. A final ordering arises when the user saves playlist after adding one or more videos to it. Therefore, the curated playlist identifier 212 compares the chronological ordering of videos based on their timestamps to their final ordering in the user's playlist. The curated playlist identifier 212 identifies playlists as curated if their chronological ordering is different from their final ordering.

In one embodiment, playlists are identified as being curated if based on distances between a chronological ordering of videos in a playlists to their final ordering in the user's playlist. There are several possible ways to define distances between two orderings of items. These include distances based on longest common subsequence, number of items or pairs that are out of order, number consecutive items that are out of order, etc. In one embodiment, the curated playlist identifier 212 measures distance between sequences by penalizing a reordering if two consecutive elements are out of place, by counting the number of consecutive elements that are out of chronological order, and dividing that count by the total number of consecutive pairs in the sequence (which is always N−1 for N elements). For example, if three pairs of videos are out of order (relative to their chronological order), it results in a calculation of 3 errors. By such a measure, a playlist of 8 videos and 3 errors will have a distance of 0.43 as (3 errors divided by 7). It is noted, however, that a reordered sequence with 3 errors may be created by moving one video: for example, the sequence <A, B, C, D> if reordered to <A, C, B, D> has 3 errors, and a distance of 1 since there are 3 consecutive pairs. A typical video hosting server 100 will have about 75,000 curated playlists per one million music video playlists, with an average length of the playlists being between 26 and 30 videos, with approximately five million unique music videos in these playlists.

The mood extractor 214 extracts moods or semantics associated with each curated playlists to enable training a classifier. Each video in a video hosting server 100 repository has an associated set of audio-video features. These features capture a variety of distinctive video and audio attributes. However, this representation is sparse, high-dimensional (10,000 features) and often redundant. It is beneficial therefore to also determine a video genre or mood (e.g., rap, rock, country, pop, fast, slow, happy, sad, etc) associated with each playlist. Many curated playlists in a video hosting server repository have informative descriptors, either through tags or titles associated with each playlist. The adjectives in the tags and titles are often effective summaries of the musical attributes of most videos in the playlists. For example, a playlist tagged with 'children's songs' is highly likely to contain songs with musical qualities that would appeal to children. Similarly, it is unlikely that songs in a playlist tagged 'death metal music' are likely to appeal to children. To extract moods associated with a playlist, the mood extractor 214 identifies the most frequently occurring adjectives associated with the curated playlists. The mood extractor 214 can obtain a high confidence list of between 100 and 150 music mood attributes from the curated playlist identified from the video hosting server 100. Alternatively, the mood attribute can be obtained from a standard taxonomy of music genres and moods.

The mood classifier 216 classifies videos to the musical moods extracted by the mood extractor 214. For example, given the unique videos identified in curated playlists, the mood classifier 216 classifies each video to the music mood attributes. The mood classifier 216 may classify the videos using a variety of classifiers, including but not limited to training a corresponding number of one vs. all Adaboost to classify the videos, with one classifier assigned to each mood attribute. An Adaboost classifier is described in "Experiments with a new boosting algorithm" Y. Freund and R. E. Schapire, *In Proceedings of the 13$^{th}$ International Conference on Machine Learning*, pages 148-156, 1996, and incorporated in its entirety herein. Each video is given a mood score by each of the mood classifiers, to create a vector representation ('mood vector') using the mood scores as vector components.

The clustering module 217 clusters the videos in a music mood feature space, using any clustering method, including, but not limited to K-means clustering on the mood vectors to obtain a vector quantization of the feature space. For example, 500 clusters have been found sufficient for a collection of about 5 million unique videos identified from the curated playlists. A reduction in errors for additional clusters is generally insignificant compared to the increase in model complexity.

The transition matrix module 218 identifies a probability of transitions between the clusters of videos in the mood space. Once the unique videos identified from curated playlists are mapped into one of the K clusters based on their mood features, the transition matrix module 218 learns a first order Markov chain model by counting transitions between clusters of video features. The transition matrix module 218 generates a transition matrix to describe the probability of transitions of a Markov chain, wherein the probability $P_{i,j}$ of a transition from a first cluster $C_i$ to second cluster $C_j$ is calculated by taking the number of transitions $T_{i,j}$ from the first cluster to a second cluster, divided by the total number of transitions $T_i$ from the first cluster to all other clusters. For example, if there a total of 100 transitions from cluster 1 ($T_1$=100), and 15 of these transitions are to cluster 2 ($T_{1,2}$=15), then the transition probability $P_{1,2}$ is 0.15. Additionally, the transition matrix module 218 calculates a probability $S_i$ that a cluster $C_i$ will start a sequence or a playlist by identifying a number of playlists starting at a particular cluster $C_i$ and dividing it by the total number of playlists. Similarly, the transition matrix module 218 calculates a probability $E_i$ that a cluster $C_i$ will end a playlist by identifying a number of playlists ending at a particular cluster $C_i$ and dividing it by the total number of playlists.

The Markov chain model learned by the transition matrix module 218 including transitions from one cluster to another and probabilities of a cluster starting or ending a playlist are utilized by all three sequencing algorithms described below.

The playlists sequencing module sequences a set of videos using one of three different approaches. The playlist sequencing module 220 comprises a digraph routing sequencer 222, a sampling sequencer 224 and a random walk sequencer 226. Each sequencer illustrated in the playlist sequencing module 220 implements a sequencing technique that produces results that are a reasonable improvement over random shuffle.

Sequencing by Digraph Routing

The digraph routing sequencer 222 sequences a set of videos by constructing a digraph using the Markov model learned by the transition matrix module 218 and ordering the videos by identifying a shortest path through the digraph such that each video is visited once. Given an unordered set of videos, the digraph routing sequencer 222 constructs a directed graph with videos as nodes and appends two special nodes to the graph, a start node and a stop node. The end node has a single outgoing edge to the start node and the start node has no other incoming edges. The digraph routing sequencer 222 obtains a semantic feature representation for each video in the graph and maps it to its nearest cluster center. Semantic features of a video and clusters are described in greater detail in reference to the mood extractor module 214, the mood classifier 216 and the clustering module 217. The start node is connected to every video node by an outgoing edge. Since the digraph routing sequencer 222 wants to encourage paths through the digraph that start at nodes with high probability of starting a sequence, the edges outgoing from the start nodes are weighted by an inverse of the start probability value calculated by the transition matrix 218. Similarly, the end node has incoming edges from each video. The weight of each of these edges is an inverse of their probability to end a playlists as identified by the transition matrix.

It is noted here that some videos in a given set of videos may belong to the same cluster. Therefore, they are interchangeable in a sequence or a playlist. For example, if two videos in a set of three videos belong to a same cluster, the third video has an equal probability to transition to either one of the videos in the same cluster. However, it is more natural for it to transition to a video that is nearest to it. Thus, it is useful to encourage not only transitions that are frequently observed in the model generated by the transition matrix module 218, but also transitions between similar videos. The digraph routing sequencer 222 encourages such transitions by generating a transition matrix based on the similarities between videos in a set. The digraph routing sequencer 222 calculates a Euclidean distance between features of videos, wherein the scale to measure distance is variable and based on distances between a video and 10 of its nearest neighbors. Scale invariant similarity measure is described in "Self-tuning Spectral Clustering." By L. Zelnik-Manor and P. Perona in *Advances in Neural Information Processing Systems* 17, pages 1601-1608, 2004 and incorporated in its entirety herein. The similarities are converted to random walk transition probabilities and a similarities based transition matrix is generated by the digraph routing sequencer 222. Additionally, the digraph routing sequencer 222 connects individual video nodes using a weight that in inversely proportional to a convex sum of transition probabilities based on the similarity based transition matrix calculated by the digraph routing sequencer 222 and the transition matrix calculated by the transition matrix module 218. The digraph routing sequencer 222 sequences videos in a playlist by finding the shortest path through the digraph, starting at a start video node and ending at an end video node, such that each node in the digraph is visited only once. The digraph routing sequencer 222 uses an approximate solution to the traveling salesman problem to find the shortest path. An implementation of the digraph routing sequencer 222 typically takes less than 30 ms to sequence a set of 50 videos.

Sequencing by Sampling

The sampling sequencer 224 sequences a set of videos by generating several candidate sequences by sampling the Markov model learned by the transition matrix module 218 and selecting the most probable sequence. The sampling sequencer 224 uses videos in an uncurated video playlists as inputs, the Markov chain model generated by the classifier training module 210 as an algorithm and a budget to select a sampled sequence. The budget can either be the number of samples that the sampling sequencer 224 will generate before declaring a winner or a time limit after which the sampling sequencer 224 will generate a winner. In one embodiment, the sampling sequencer 224 can be configured to generate 100 samples and pick a sample with the highest probability given the Markov model provided by the classifier training module 210.

The sampling sequencer 224 generates a probability based transition matrix similar to the transition matrix generated by the transition matrix module 218. The probability based transition matrix is constructed as follows:

$$M^k(i, j) = \frac{T(l_i, l_j)}{\# \text{ of videos in the bag} \in l_j} \quad (1)$$

$$T_m^k(i, j) = \frac{M^k(i, j)}{\sum_j M^k(i, j)} \quad (2)$$

The intuition behind the probability based transition matrix is to equally distribute the probability mass of a transition between clusters, between all occurrences of that cluster in a bag of videos. For each sample, the sampling sequencer 224 starts with the probability based transition matrix and identifies a video to start the sequence, based on $p_{start}$ wherein the selected video has the highest probability of starting in a particular state. For index 2 to N−1, the sampling sequencer 224 samples the next video in the sequence and updates the model since the number of videos belonging to a cluster in the bag may change. Note that the $M^k(i, j)$ value is set to zero if there are no videos in the bag belonging to the cluster $l_j$. Similarly, the transition probability matrix based on similarities is also updated as each sample is generated. The column corresponding to the last generated sample, in the matrix $T_s$ is nullified and the $T_s$ is renormalized to retain its properties as a transition probability matrix. $T_s^k$ reflects the updated matrix as follows:

$$T_{sample(i,j)}^k = \lambda T_m^k + (1-\lambda) T_s^k \quad (3)$$

Once the sampling sequencer 224 samples each video from 2 to N−1, it appends the last video to the end of the sequence, wherein the last video has the highest probability of ending the sequence as identified by its $p_{end}$ value. Once all the videos in the give set or bag of videos are sampled, the sampling sequencer 224 scores the sequence using the original Markov model calculated by the classifier training module 210. If the score for the sampled playlist is better than the other scores, the sequence is retained. If the score is lower, the playlist is discarded. As such, over several samples, the best scoring playlist is identified.

Sequencing by Absorbing Random Walks

The random walk sequencer 226 sequences a set of videos by reordering a set of videos by performing a diversity enhancing random walk on a graph wherein videos in the set represent nodes and using the Markov chain model learned by the playlist sequencing module 220 to define weights of connections between the nodes in the graph. The random walk sequencer 226 constructs a random walk matrix as a weighted sum of a similarity matrix generated by the digraph routing sequencer 222 and a prior matrix. The prior matrix is generated by utilizing play counts of individual videos to promote popular videos over unpopular ones. The prior value for each video is as follows:

$$p_i = \frac{\text{play count for } v_i}{\sum_i \text{play count for } v_j} \quad (4)$$

Using the similarity matrix generated by the digraph routing sequencer 222 and the prior values of videos, a random walk matrix is constructed as follows:

$$T_{grasshopper} = \lambda T_s + (1-\lambda) 1 p^T \quad (5)$$

The random walk matrix is described in greater detail in "Improving diversity in ranking using absorbing random walks," by X. Zhu, A. Goldberg, J. V. Gael and D. Andrzejewski in HLT-NAACL, pages 97-104; *The Association for Computation Linguistics,* 2007 and incorporated in its entirety herein.

Method of Sequencing

Figure 3:
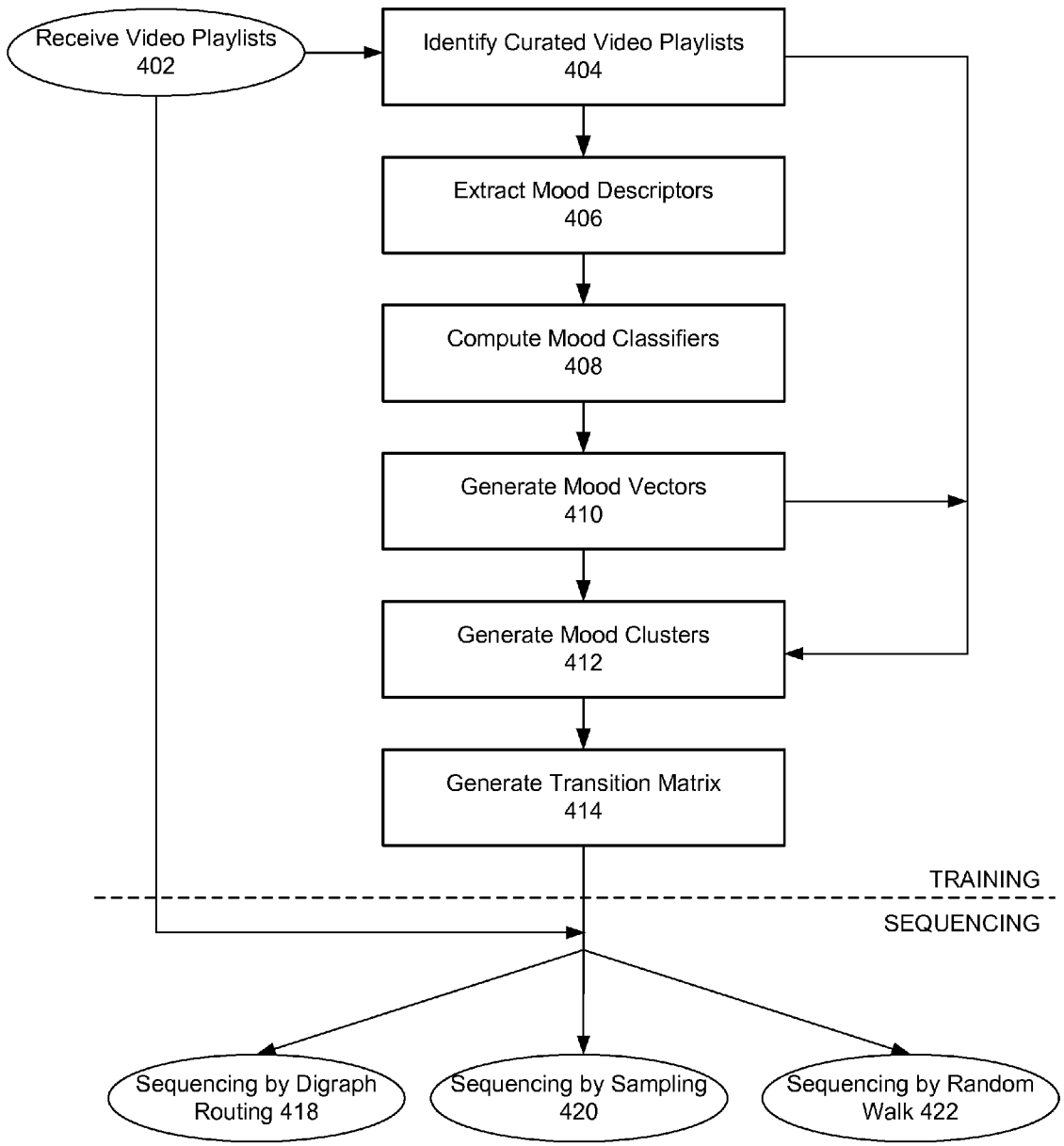
FIG. 3 is a process diagram for sequencing a playlist, in accordance with an embodiment.

FIG. 3 illustrates the relationship between the various modules describe above, and data processing involved in the process of sequencing playlists according to one embodiment.

The process begins with accessing 402 the video playlists. The video playlists may be created on a video hosting service described in FIG. 1. The playlists may be curated or uncurated playlists. Curated playlists include playlists that have been arranged in a particular order by a user, whereas uncurated playlists are arranged simply in the chronological order in which the videos are added. The process identifies 404 curated video playlists amongst the received 402 video playlists. The process identifies 404 playlists as curated if its videos have a final ordering that is different than the order of when the videos were added to the playlists, that is if the final ordering is different from the chronological ordering.

The process extracts 406 mood descriptors from informative descriptions associated with the curated playlists, using the most frequently occurring adjectives in the informative descriptions of playlists to identify moods associated with each playlist. The process computes 408 a set of mood classifiers, using videos associated with each mood as positive training examples for a corresponding mood classifier.

Once the mood classifiers are trained, each video in the curated playlists can be scored with each mood classifier, to generate 410 a mood vector for each video, where the components of the mood vector are the scores from the mood classifiers. The process generates 412 mood clusters by clustering the videos in a music mood feature space using their mood vectors.

Thereafter, the process generates then 414 a transition matrix from the generated mood clusters of videos. A transition matrix identifies a probability of transitions between the clusters of videos in the mood space, based on the number of transitions between clusters. Thus, the transition matrix stores for each pair of clusters ($C_i$, $C_j$), a transition probability $P_{i,j}$.

Once a transition matrix is generated 414, the training portion is concluded and the process is enabled to sequence any given input playlists containing a given set videos based on the generated transition matrix.

Given an unordered playlist, the process described herein provides for one of three ways to sequence the playlist: sequencing by digraph routing 418, sequencing by sampling 420 and sequencing by random walk analysis 422. Each of the sequencing methods is described in greater detail below in reference to FIG. 3. Each sequencing method produces results that are a reasonable improvement over random shuffle.

Sequencing by Digraph Routing

The process sequences a playlist by digraph routing 418 by constructing a digraph using the Markov model learned during the training process and identifying a shortest path through the digraph such that each video is visited once. To encourage transitions between videos in a same cluster, a transition matrix based on similarities between videos in a set is generated by calculating a Euclidean distance between features of videos, wherein the scale to measure distances is variable and based on distances between a video and its nearest neighbors. A random walk based on the Euclidean distances is more likely to go to videos that are close to it. Based on the random walk, the process generates a similarities based transition matrix. The process sequences 418 an unordered playlist by finding the shortest path through the digraph, starting at a start video node and ending at an end video node, with each video being visited once. An approximate solution to the traveling salesman problem is used to find the shortest path. An implementation of the process 418 typically takes less than 30 ms to sequence a set of 50 videos.

Sequencing by Sampling

An unordered playlist can also be sequenced by the sampling method 420, wherein the sequence is selected from several candidate sequences generated from sampling the Markov model learned in the training phase of the process. The process uses videos of an unordered playlist as inputs to the Markov chain model learned during the training phase of the process and picks a sample with a highest probability. To identify probabilities of a sample, a probability based transition matrix is generated. If the probability score for the sampled playlist is better than the other scores, the sequence is retained. If the score is lower, the playlist is discarded. As such, over several samples, the best scoring playlist is identified by the sequencing by sampling 420 method.

Sequencing by Absorbing Random Walks

An unordered playlist can also be sequenced via a random walk 422 method. The process generates a graph using the Markov chain model learned during the training phase of the process, wherein the graph includes weights of connections between the nodes. Additionally, the process generates a random walk matrix as a weighted sum of a similarity matrix and a prior matrix, wherein the prior matrix is generated by utilizing play counts of individual videos. The videos in unordered sequences are sequenced based on the result of a random walk on the graph based on the generated random walk matrix.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method for sequencing videos in a playlist, the method comprising:
    extracting mood descriptors from adjectives associated with playlists in a video repository, the mood descriptors providing a summary of musical attributes of most videos of each playlist;
    identifying curated playlists among the playlists in the video repository, the curated playlists being ordered by a user;
    training a classifier from the extracted mood descriptors;
    generating dimensional mood features for each video in the curated playlists based on the trained classifier;
    clustering the dimensional mood features;
    mapping each video in each curated playlist to a cluster;
    generating a transition matrix describing a frequency of transitions between the clusters for each curated playlist; and
    sequencing a given playlist using at least one of digraph routing, sampling and random walk sequencing methods and based on the generated transition matrix.

2. The method of claim 1, wherein identifying curated playlists comprises identifying a chronological ordering of when videos are added to a playlist and comparing the chronological ordering to a current ordering of the videos, wherein a difference between the chronological ordering and the current ordering indicating a curated playlist.

3. The method of claim 1, wherein the mood descriptors comprise at least one of a video genre, tempo, mood and intended audience.

4. The method of claim 1, wherein the mood descriptors are identified by identifying adjectives provided in tags or titles of the playlists.

5. The method of claim 1, wherein the dimensional mood features are clustered using K-means clustering.

6. The method of claim 1, wherein sequencing the given playlist using digraph routing comprises:
    receiving the given playlist for sequencing;
    generating a similarity based transition matrix encouraging transitions between videos in a same cluster;
    creating a graph by mapping videos in the given playlist to clusters representing dimensional music moods based on the similarity based transition matrix;
    appending a start node and an end node to the graph, the start node comprising one incoming edge and at least one outgoing edge, the end node comprising one outgoing edge and at least one incoming edge; and
    computing a shortest path through the digraph starting at the start node, ending at the end node and visiting each node once, the shortest path computed using an approximate solution to the traveling salesman problem.

7. The method of claim 1, wherein sequencing the given playlist by sampling comprises:
    using videos in the given playlist as inputs to a generated Markov model;
    generating a probability based transition matrix distributing a probability mass of a transition between clusters of videos and between all occurrences of each cluster in the given playlist;
    identifying a next video based on the transition matrix and the probability based transition matrix;
    updating the transition matrix and the probability based transition matrix based on the identified video each time a next video is identified;

identifying a sequence by iteratively repeating the steps of identifying a next video and updating the transition matrix and the probability based transition matrix until each video is sampled; and retaining a best sequence having a highest probability score, the probability score generated using the probability based transition matrix.

8. The method of claim 1, wherein sequencing by random walk further comprising:

generating a transition matrix comprising a weighted sum of a similarity matrix and a prior matrix, the similarity matrix including similarity features converted to random walk transition probabilities and the transition matrix including prior counts of videos converted to random walk transition probabilities; and ordering videos in the given playlist by performing an absorbing random walk analysis on a graph based on the videos.

9. A computer program product for sequencing videos in a given playlist, the computer program product comprising a non-transitory computer-readable storage medium containing computer program code for:

extracting mood descriptors from adjectives associated with playlists in a video repository, the mood descriptors providing a summary of musical attributes of most videos each playlist;

identifying curated playlists among the playlists in the video repository, the curated playlists being ordered by a user;

training a classifier from the extracted mood descriptors;

generating dimensional mood features for each video in the curated playlists based on the trained classifier;

clustering the dimensional mood features;

mapping each video in each curated playlist to a cluster;

generating a transition matrix describing a frequency of transitions between the clusters for each curated playlist; and sequencing the given playlist using at least one of digraph routing, sampling and random walk sequencing methods and based on the generated transition matrix.

10. The computer program product of claim 9, wherein identifying curated playlists comprises identifying a chronological ordering of when videos are added to a playlist and comparing the chronological ordering to a current ordering of the videos, wherein a difference between the chronological ordering and the current ordering indicating a curated playlist.

11. The computer program product of claim 9, wherein the mood descriptors comprise at least one of a video genre, tempo, mood and intended audience.

12. The computer program product of claim 9, wherein the mood descriptors are identified by identifying adjectives provided in tags or titles of the playlists.

13. The computer program product of claim 9, wherein the dimensional mood features are clustered using K-means clustering.

14. The computer program product of claim 9, wherein sequencing by digraph routing further comprising computer program code for:

receiving the given playlist for sequencing;

generating a similarity based transition matrix encouraging transitions between videos in a same cluster;

creating a graph by mapping videos in the given playlist to clusters representing dimensional music moods based on the similarity based transition matrix;

appending a start node and an end node to the graph, the start node comprising one incoming edge and at least one outgoing edge, the end node comprising one outgoing edge and at least one incoming edge; and computing a shortest path through the digraph starting at the start node, ending at the end node and visiting each node once, the shortest path computed using an approximate solution to the traveling salesman problem.

15. The computer program product of claim 9, wherein sequencing the given playlist by sampling further comprises computer program code for:

using videos in the given playlist as inputs to a generated Markov model;

generating a probability based transition matrix distributing a probability mass of a transition between clusters of videos and between all occurrences of each cluster in the given playlist;

identifying a next video based on the transition matrix and the probability based transition matrix;

updating the transition matrix and the probability based transition matrix based on the identified video each time a next video is identified;

identifying a sequence by iteratively repeating the steps of identifying a next video and updating the transition matrix and the probability based transition matrix until each video is sampled; and retaining a best sequence having a highest probability score, the probability score generated using the probability based transition matrix.

16. The computer program product of claim 9, wherein sequencing by random walk further comprising computer program code for:

generating a transition matrix comprising a weighted sum of a similarity matrix and a prior matrix, the similarity matrix including similarity features converted to random walk transition probabilities and the transition matrix including prior counts of videos converted to random walk transition probabilities; and ordering videos in the given playlist by performing an absorbing random walk analysis on a graph based on the videos.

\* \* \* \* \*